United States Patent
Brace

(10) Patent No.: US 10,961,373 B2
(45) Date of Patent: Mar. 30, 2021

(54) TIRE WITH TREAD OF CARBON BLACK REINFORCED RUBBER COMPOSITION CONTAINING SPECIALIZED STYRENE/BUTADIENE ELASTOMER

(71) Applicant: The Goodyear Tire & Rubber Company, Akron, OH (US)

(72) Inventor: Lauren Elizabeth Brace, Chagrin Falls, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 64 days.

(21) Appl. No.: 16/442,810

(22) Filed: Jun. 17, 2019

(65) Prior Publication Data

US 2020/0024431 A1    Jan. 23, 2020

Related U.S. Application Data

(60) Provisional application No. 62/699,765, filed on Jul. 18, 2018.

(51) Int. Cl.
*C08L 9/06*    (2006.01)
*B60C 1/00*    (2006.01)
*B60C 11/00*   (2006.01)

(52) U.S. Cl.
CPC ............. *C08L 9/06* (2013.01); *B60C 1/0016* (2013.01); *B60C 11/0008* (2013.01); *B60C 2011/0025* (2013.01); *C08L 2205/025* (2013.01); *C08L 2205/035* (2013.01); *C08L 2207/322* (2013.01)

(58) Field of Classification Search
CPC ....................................................... C08L 9/06
See application file for complete search history.

(56) References Cited

U.S. PATENT DOCUMENTS

| | | | |
|---|---|---|---|
| 7,919,553 B2 | 4/2011 | Kawasaki et al. | |
| 8,022,136 B2 | 9/2011 | Yano et al. | |
| 8,044,118 B2 | 10/2011 | Sakaki et al. | |
| 8,100,157 B2 | 1/2012 | Hattori et al. | |
| 2013/0274404 A1* | 10/2013 | Vasseur | C08K 5/31 524/526 |
| 2018/0362738 A1* | 12/2018 | Hahn | C08L 9/06 |

* cited by examiner

*Primary Examiner* — Arrie L Reuther
(74) *Attorney, Agent, or Firm* — John D. DeLong

(57) ABSTRACT

The invention relates to a tire having a tread of carbon black reinforced rubber composition containing a specialized styrene/butadiene elastomer with molecular weight profile containing a limited low molecular weight content and triglyceride vegetable oil.

14 Claims, No Drawings

TIRE WITH TREAD OF CARBON BLACK REINFORCED RUBBER COMPOSITION CONTAINING SPECIALIZED STYRENE/BUTADIENE ELASTOMER

FIELD OF THE INVENTION

The invention relates to a tire having a tread of carbon black reinforced rubber composition containing a specialized styrene/butadiene elastomer with molecular weight profile containing a limited low molecular weight content and triglyceride vegetable oil.

BACKGROUND OF THE INVENTION

Tires are sometimes provided with a tread of a rubber composition comprised of at least one conjugated diene-based elastomer which includes a styrene/butadiene elastomer.

It is desired to evaluate the use of a specialized styrene/butadiene elastomer for such purpose where the rubber composition contains reinforcing filler comprised of rubber reinforcing carbon black without precipitated silica reinforcement where said specialized styrene/butadiene elastomer has a molecular weight profile restricted to having a low molecular weight content limited to a maximum of about six, alternately up to about 5.5, percent of weight average molecular weight (Mw) of up to 150,000.

It is further desired to evaluate providing an inclusion of freely added triglyceride vegetable oil in the carbon black reinforced rubber composition containing the specialized styrene/butadiene elastomer.

The purpose is to evaluate promoting a lower rubber stiffness at lower temperatures for the tread rubber. By the term "freely added", it is meant that the vegetable oil is added to the rubber composition containing the specialized styrene/butadiene elastomer during its physical mixing of rubber and rubber compounding ingredients in contrast to "extending" the specialized styrene/butadiene elastomer with the triglyceride vegetable oil.

It is to be appreciated that the rubber composition may also contain rubber processing oil in a form of petroleum based rubber processing oil which may be freely added to the rubber composition or provided as an elastomer extending oil for an elastomer in the rubber composite such as for the specialized styrene/butadiene elastomer.

Therefore, in one embodiment, the rubber composition may contain a combination of rubber processing oils comprised of the aforesaid freely added triglyceride vegetable oil and petroleum based rubber processing oil which may be provided as an elastomer extending oil (for example for extending the specialized styrene/butadiene elastomer) and/or provided as a freely added rubber processing oil to the rubber composition so long as a major portion (greater than 50 weight percent) of the rubber processing oil is the triglyceride vegetable oil.

Historically it is recognized that triglyceride based vegetable oils such as, for example, soybean oil, have been previously suggested for addition to various rubber compositions such as for example, and not intended to be limiting, in U.S. Pat. Nos. 7,919,553, 8,100,157, 8,022,136 and 8,044,118.

However, while vegetable triglyceride oils have previously been mentioned for use in various rubber compositions, including rubber compositions for tire components, use of freely added vegetable triglyceride oil to the carbon black reinforced rubber composition of this invention containing the specialized styrene/butadiene elastomer is believed to be novel and a significant departure from past practice to both aid in processing of the uncured rubber composition and to provide cured rubber composition for a tire tread.

While a mechanism might not be fully understood, it is theorized that the presence of a significantly low molecular weight content in a styrene/butadiene elastomer can promote absorbing greater energy within the elastomer. Such energy absorption may thereby contribute to promoting a higher hysteresis of the cured rubber composition, as may be evidenced by one or more of its rebound and tangent delta physical properties, and thereby promote higher heat generation within the rubber composition, or tire component, during tire service. It is envisioned that a lower content of low molecular weight portion of the elastomer might beneficially promote less internal heat generation within the rubber composition during its dynamic use and an associated beneficial reduction in the rubber composition's hysteresis.

Therefore, such evaluation of providing an inclusion of freely added vegetable oil in the carbon black reinforced rubber composition containing the specialized styrene/butadiene elastomer is to be undertaken.

In the description of this invention, terms such as "compounded rubber", "rubber compound" and "compound", if used herein, refer to rubber compositions containing elastomers blended with various ingredients, including curatives such as sulfur and cure accelerators. The terms "elastomer" and "rubber" may be used herein interchangeably unless otherwise indicated. It is believed that such terms are well known to those having skill in such art. The molecular weight of an elastomer may be determined, for example, by gel permeation chromatography as would be understood as being well known by those having skill in such art.

Disclosure and Practice of the Invention

In accordance with this invention, a pneumatic rubber tire is provided having a tread of a rubber composition containing, based on parts by weight per 100 parts by weight of the rubber (phr), (A) conjugated diene-based elastomers comprised of:
  (1) about 30 to about 60, alternately about 40 to about 50 phr of a specialized styrene/butadiene elastomer having a molecular weight profile comprised of a weight average molecular weight (Mw) in a range of from about 500,000 to about 800,000 with a low molecular weight content limited to a maximum of six, alternately up to about 5.5, percent of said styrene/butadiene elastomer having a number average molecular weight (Mw) of up to 150,000, (for example, a content in a range of from a negligible amount of from about 1 percent up to a maximum of about six or about 5.5 percent of a weight average molecular weight in a range of from a negligible 1000 up to 150,000),
  (2) about 40 to about 70, alternately about 50 to about 60, phr of at least one additional conjugated diene-based elastomer,
(B) about 40 to about 150, alternately about 40 to about 120, phr of reinforcing filler comprised of rubber reinforcing carbon black, particularly without precipitated silica, and
(C) about 10 to about 50, alternately about 20 to about 40, phr, of rubber processing oil comprised of triglyceride vegetable oil.

By desiring the rubber composition to be without precipitated silica, it is meant that the rubber composition may contain minimal, if any, precipitated silica such as being limited to an amount that contributes little, if any, to the reinforcement of the rubber composition, thereby leaving the filler reinforcing effect of the rubber composition to the carbon black. For example, it is desired that the rubber composition is limited to zero or up to about 10 phr of precipitated silica.

In one embodiment, the carbon black reinforced rubber composition may contain a combination of rubber processing oils comprised of petroleum based rubber processing oil and triglyceride vegetable oil so long as a major portion (greater than 50 weight percent and desirably at least 60 weight percent) of the rubber processing oil is said triglyceride vegetable oil or even up to about 100 weight percent of the rubber processing oil being triglyceride vegetable oil.

In further accordance with this invention, said tire tread is provided as a sulfur cured rubber composition.

In one embodiment, the said specialized styrene/butadiene elastomer has a heterogeneity index (Mw/Mn) in a range of from about 1.5/1 to about 1.8/1.

The molecular weight characterization of the specialized styrene/butadiene elastomer may be carried out (ASTM D4001-13) using an Agilent 1260 GPC (gel permeation chromatography) system equipped with an Agilent 1260 VWD ultraviolet detector and Wyatt Technology Light Scattering, Viscosity, and Refractive index detectors with tetrahydrofuran as the mobile phase.

In one embodiment, said vegetable triglyceride oil is comprised of a combination of saturated and unsaturated esters where said unsaturated esters are comprised of a combination of at least one of oleic acid ester, linoleate acid ester and linoleate acid ester. Said saturated esters may be comprised of, for example and not intended to be limiting, at least one of stearic acid ester and palmitic acid ester.

In one embodiment, said vegetable triglyceride oil is comprised of at least one of soybean oil, sunflower oil, rapeseed oil, canola oil, desirably at least one of soybean oil and sunflower oil.

In practice, such tire tread is intended for ground-contacting.

In practice, suitable rubber reinforcing carbon blacks may be found, for example, in *The Vanderbilt Rubber Handbook*, (1990), 13th edition, Pages 416 through 419.

In one embodiment, said additional conjugated diene-based elastomers may be, for example, elastomers comprised of at least one of isoprene and 1,3-butadiene and of styrene and at least one of isoprene and 1,3-butadiene.

Representative of such additional conjugated diene-based elastomers may be, for example and not intended to be limiting, at least one of cis 1,4-polybutadiene, cis 1,4-polyisoprene and styrene/butadiene elastomers other than, or in addition to, said specialized styrene/butadiene elastomer having said limited molecular distribution (molecular weight profile). Said additional elastomers, including said specialized styrene/butadiene elastomer, are exclusive of elastomers containing functional groups reactive with hydroxyl groups on said precipitated silica.

In practice, it is desired that such additional conjugated diene-based elastomers are comprised of a combination of cis 1,4-polybutadiene rubber and cis 1,4-polyisoprene rubber. The cis 1,4-polyisoprene rubber may be at least one of natural and synthetic cis 1,4-polybutdiene rubber. For example, the additional conjugated diene-based rubber may be present in the rubber composition in the aforesaid amount of from about 40 to about 70, alternately about 50 to about 60, phr and comprised of about 20 to about 50 phr of cis 1,4-polybutadiene rubber and about 10 to about 30 phr of cis 1,4-polyisoprene rubber.

The aforesaid specialized styrene/butadiene elastomer may optionally be tin or silicon coupled to form a star-branched elastomer whereby its molecular weight is significantly increased.

In practice, the specialized styrene/butadiene elastomer with said molecular weight profile comprised of the restricted low molecular weight content has a bound styrene content in a range of from about 10 to about 40 percent. It may have a vinyl 1,2-content in a range of from about 10 to about 60 percent.

For tin coupling of the specialized styrene/butadiene elastomer, various organo tin compounds, may be used. Representative of such compounds are, for example, alkyl tin trichloride, dialkyl tin dichloride, yielding variants of a tin coupled styrene/butadiene copolymer elastomer.

It is readily understood by those having skill in the art that the rubber compositions of the tread would be compounded with conventional compounding ingredients including the aforesaid rubber reinforcing carbon black as well as antidegradant(s), processing oils, fatty acid comprised of, for example, stearic, oleic and palmitic acids and zinc oxide.

Processing aids may be used, for example, waxes such as microcrystalline and paraffinic waxes, in a range, for example, of about 1 to 5 phr or about 1 to about 3 phr; and resins, usually as tackifiers, such as, for example, synthetic hydrocarbon and natural resins in a range of, for example, about 1 to 5 phr or about 1 to about 3 phr. A curative might be classified as sulfur together with one or more sulfur cure accelerator(s). In a sulfur and accelerator(s) curative, the amount of sulfur used may be, for example, from about 0.5 to about 5 phr, more usually in a range of about 0.5 to about 3 phr; and the accelerator(s), often of the sulfenamide type, is (are) used in a range of about 0.5 to about 5 phr, often in a range of about 1 to about 2 phr. The ingredients, including the elastomers but exclusive of sulfur and accelerator curatives, are normally first mixed together in a series of at least two sequential mixing stages, although sometimes one mixing stage might be used, to a temperature in a range of, for example, about 145° C. to about 185° C., and such mixing stages are typically referred to as non-productive mixing stages. Thereafter, the sulfur and accelerators, and possibly one or more retarders and possibly one or more antidegradants, are mixed therewith to a temperature of, for example, about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread is then typically built onto a sulfur curable tire carcass and the assembly thereof cured in a suitable mold under conditions of elevated temperature and pressure by methods well-known to those having skill in such art.

The invention may be better understood by reference to the following example in which the parts and percentages are by weight unless otherwise indicated.

EXAMPLE

Rubber compositions were prepared to evaluate specialized solvent solution polymerization prepared styrene/butadiene elastomers (specialized styrene/butadiene elastomer as a specialized SSBR) which contain reinforcing filler composed of rubber reinforcing carbon black without precipitated silica and therefore without silica coupler and to further evaluate an inclusion of freely added triglyceride vegetable oil in a form of soybean oil.

Comparative rubber Samples A and B contained a conventional aqueous emulsion polymerization prepared styrene/butadiene/styrene rubber prepared by polymerization of styrene and 1,3-butadiene monomers (ESBR) having a bound styrene content of about 23.5 percent and vinyl content (based on the butadiene portion) of about 12.5 percent.

Experimental rubber Samples C and D contained a specialized styrene/butadiene rubber prepared by organic solution polymerization of styrene and 1,3-butadiene monomers (specialized SSBR) having a bound styrene content of about 30 percent and vinyl content (based on the butadiene portion) of about 41 percent with a molecular weight profile comprised of an overall weight average molecular weight (Mw) of about 683,000 wherein about 3 percent thereof had a weight average molecular weight (Mw) of only up to 150,000.

Experimental rubber Sample D contained freely added vegetable oil in a form of soybean oil to replace the freely added petroleum based oil of rubber Sample C.

The reinforcing filler for rubber Samples A, B, C and D was rubber reinforcing carbon black without precipitated silica and thereby also without silica coupler.

The basic formulation is illustrated in the following Table 1 which is presented in terms of parts per 100 parts by weight of rubber (phr).

As previously indicated, the rubber compositions may be prepared by mixing the elastomers(s) without sulfur and sulfur cure accelerators in a first non-productive mixing stage (NP-1) in an internal rubber mixer for about 4 minutes to a temperature of about 160° C. If desired, the rubber mixture may then be mixed in a second non-productive mixing stage (NP-2) in an internal rubber mixer for about 4 minutes to a temperature of about 160° C. while additional ingredients may optionally be added. The resulting rubber mixture may then be mixed in a productive mixing stage (PR) in an internal rubber mixer with sulfur and sulfur cure accelerator(s) for about 2 minutes to a temperature of about 110° C. The rubber composition may be sheeted out and cooled to below 50° C. between each of the non-productive mixing steps and prior to the productive mixing step. Such rubber mixing procedure is well known to those having skill in such art.

TABLE 1

| | Parts (phr) |
|---|---|
| Non-Productive Mixing Step (NP) - Mixed to 160° C. | |
| Emulsion polymerization prepared styrene/butadiene rubber (ESBR)[1] | 60, 43 & 0 |
| Specialized styrene/butadiene rubber (specialized SSBR)[2] | 0, 43 |
| Cis 1,4-polybutadiene rubber[3] | 20 & 37 |
| Synthetic cis 1,4-polyisooprene rubber[4] | 20 |
| Fatty acid[5] | 2 |
| Total extension petroleum based oil in oil extended elastomers | 23, 16 & 9 |
| Freely added soybean oil[6] | 0 & 27 |
| Freely added petroleum based oil (naphthenic oil) | 20, 27 & 0 |
| Zinc oxide | 1.8 |
| Carbon black (N120)[7] | 85 |
| Wax, microcrystalline and/or paraffinic | 3.8 & 1.5 |
| Antioxidant(s) | 2.3 & 2.8 |
| Productive Mixing Step (PR) - Mixed to 110° C. | |
| Sulfur | 1.4 & 1.8 |
| Accelerator(s)[8] | 1.6 & 1.4 |

[1]Aqueous emulsion polymerization prepared styrene/butadiene rubber (ESBR) as PLF1763 from The Goodyear Tire and Rubber Company having a bound styrene content of about 23.5 percent and vinyl-1,2-content of about 12.5 percent, an overall weight average molecular weight (Mw) of about 9,600,000 and a heterogeneity (polydispersity) index, (Mw/Mn), of about 2.3/1. The elastomer was petroleum oil extended with 37.5 parts by weight oil per 100 parts by weight of the elastomer and is reported in the Table in parts by weight of the elastomer.
[2]Specialized organic solvent solution polymerization derived styrene/butadiene rubber (specialized SSBR) having a bound styrene of about 30 percent and vinyl content of about 41 percent and a molecular weight profile comprised of an overall weight average molecular weight (Mw) of about 535,000 with about four percent thereof having a weight average Mw of up to about 150,000 and a heterogeneity (polydispersity) index (Mw/Mn) of about 1.49/1. The elastomer was petroleum oil extended with about 20 parts by weight oil per 100 parts by weight of the elastomer and is reported in the Table in parts by weight of the elastomer.
[3]Cis-1,4-polybutadiene rubber as BUD1207 from The Goodyear Tire and Rubber Company having a Tg of about −105° C.
[4]Synthetic cis 1,4-polyisoprene rubber
[5]Fatty acid comprised of stearic, palmitic and oleic acids
[6]Soybean oil as Cargill Master Chef soybean oil 22393
[7]Rubber reinforcing carbon black as N120, an ASTM characterization
[8]Sulphenamide and diphenyl guanidine sulfur cure accelerators The following Table 2 represents the uncured and cure behavior and various physical properties of the rubber compositions. Test samples were cured for about 14 minutes at about 160° C.

TABLE 2

| | Samples | | | |
|---|---|---|---|---|
| | Comparative | | Experimental | |
| | A | B | C | D |
| Styrene/butadiene rubber (ESBR) | 60 | 43 | 0 | 0 |
| Specialized Styrene/butadiene rubber (specialized SSBR) | 0 | 0 | 43 | 43 |
| Cis 1,4-polybutadiene rubber | 20 | 37 | 37 | 37 |
| Synthetic cis 1,4-polyisoprene rubber | 20 | 20 | 20 | 20 |
| Rubber reinforcing carbon black (N120) | 85 | 85 | 85 | 85 |
| Petroleum based oil (naphthenic oil) in oil extended rubber(s) | 23 | 16 | 9 | 9 |
| Freely added petroleum based oil (naphthenic oil) | 20 | 20 | 27 | 0 |
| Soybean oil addition (freely added, not rubber extended) | 0 | 0 | 0 | 27 |
| Total oil content (oil extended rubber and freely added oil) | 43 | 36 | 36 | 36 |
| Weight percent soybean oil of the rubber processing oil | NA | NA | NA | 75 |
| Wax, microcrystalline and paraffinic | 3.8 | 3.8 | 3.8 | 3.8 |
| Antioxidants | 2.3 | 2.3 | 2.3 | 2.3 |
| Sulfur | 1.4 | 1.4 | 1.4 | 1.4 |
| Sulfur cure accelerators | 1.6 | 1.6 | 1.6 | 1.6 |
| Properties | | | | |
| Rubber processing indication (RPA[1]), uncured storage modulus G', 15% strain 0.83 Hertz, 100° C. (MPa) | 0.195 | 0.248 | 0.265 | 0.25 |

TABLE 2-continued

|  | Samples | | | |
|---|---|---|---|---|
|  | Comparative | | Experimental | |
|  | A | B | C | D |
| Rubber stiffness indication (RPA[1]), cured storage modulus G' at 1% strain, 1 Hertz, 100° C., MPa (higher is better) | 2.17 | 2.78 | 2.92 | 2.45 |
| Rubber Hysteresis Indication | | | | |
| Tan delta at 10% strain, 1 Hertz, 100° C. (lower is better) | 0.27 | 026. | 0.24 | 0.21 |
| Rebound (Zwick), 100° C., % (higher is better) | 46.5 | 47.8 | 48.1 | 45.1 |
| Predictive Low Temperature Performance (ARES[2]) (lower is better) | | | | |
| Cured storage modulus G' at −20° C., 3% strain, 10 Hz (MPa) | 1.32E7 | 1.27E7 | 1.51E7 | 8.58E6 |
| Predictive Wet Traction Performance (ARES[2]) (higher is better) | | | | |
| Cured tan delta at 0° C., 3% strain, 10 Hz | 0.42 | 0.4 | 0.44 | 0.42 |
| Rubber Abrasion Resistance Indication[4] | | | | |
| DIN abrasion relative volume loss (lower is better) | 69 | 44 | 77 | 56 |
| MDR[3] test; 60 minutes at 150° C. | | | | |
| Delta torque (dN-m) | 9.58 | 11.75 | 11.71 | 9.39 |
| T90 (minutes) | 15.7 | 14.4 | 11.6 | 9.3 |
| T25 (minutes) | 6.9 | 7.0 | 5.9 | 4.8 |
| Stress-strain Properties | | | | |
| Tensile strength (MPa) | 15.2 | 16.4 | 15.7 | 14.4 |
| Elongation at break (%) | 566 | 523 | 535 | 610 |
| 300% modulus, (MPa) | 6.3 | 7.9 | 7.3 | 5.4 |
| Toughness = (tensile strength* elongation)/ 300% modulus) (higher is tougher) | 1369 | 1088 | 1444 | 1640 |

NA = not applicable
[1]Rubber process analyzer
[2]ARES analytical instrument
[3]Moving die rheometer
[4]DIN 53516 rubber abrasion test. Lower values indicate increased (improved) abrasion resistance.

From Table 2 it is observed that:
(A) Uncured Rubber Sample Processing

As expected, doubling the polybutadiene content to 37 phr for carbon black reinforced Comparative rubber Sample B from 20 phr for Comparative rubber Sample A increased the uncured rubber processing parameter for the carbon black reinforced rubber composition by 11.5 percent to a value of 0.25 MPa from 0.2 MPa which is still considered an acceptable uncured rubber processing value.

For Experimental carbon black reinforced rubber Samples C and D containing the specialized styrene/butadiene rubber (specialized SSBR) with its specialized molecular weight profile, the uncured G' storage modulus values of 0.265 and 0.25 MPa, respectively, was greater than the G' values of 0.195 and 0.248 MPa, respectively, for Comparative rubber Samples A and B. This is an indication that the inclusion of the specialized styrene/butadiene rubbers in the rubber Samples C and D with their molecular weight profiles containing the reduced low molecular weight contents increased the energy needed for processing the rubber Samples.

However, it was discovered that the inclusion of the freely added triglyceride vegetable oil in Experimental rubber Sample D beneficially reduced the energy needed for processing the Experimental rubber Sample D as compared to Experimental rubber Sample C which contained the freely added petroleum based oil. (The freely added triglyceride vegetable oil simply replaced the freely added petroleum based rubber processing oil.)

While the discovered result of inclusion of the specialized styrene/butadiene elastomer is not entirely understood, it is envisioned that the reduction in the lower molecular weight content of the styrene/butadiene elastomer increased the content of the higher molecular weight molecules of the elastomer profiles so that their polymer chain entanglements within the elastomers becomes a greater factor and promotes a higher storage modulus G' for the uncured elastomers and rubber compositions.

(B) Predictive Cold Weather, Wet Traction, and Treadwear Performances (1) The storage modulus (G') at −20° C. is used an indicator of cold weather performance. Lower values are considered better for cold weather (snow) performance for a tire tread of such rubber composition.

It is seen in Table 2 that cured Experimental carbon black reinforced rubber Samples C and D containing the specialized styrene/butadiene rubber with its molecular weight profile, reported a cured G' storage modulus value measured at −20° C. of 1.51E7 for rubber Sample C and a significantly reduced value of 8.58E6 MPa for rubber Sample D where freely added soybean oil replaced the freely added petroleum based oil. Therefore, the storage modulus (G') for rubber Sample C was greater than the storage modulus (G') values of 1.32E7 and 1.27E7 MPa, respectively, for Comparative rubber Samples A and B. However, the storage modulus (G') for Experimental rubber Sample D (containing the free added soybean oil) was beneficially significantly lower than for Experimental rubber Sample C as well as for Comparative rubber Samples A and B.

It is concluded that, with lower values of the G' (at 20° C.) considered as being better for predictive cold weather performance for a tire having a tread of such rubber composition that:

(a) Experimental rubber Sample C exhibited a reduced predictive cold weather performance (snow performance) compared to Comparative rubber Samples A and B, and
(b) Experimental rubber Sample D containing the freely added soybean oil in addition to the specialized styrene/butadiene elastomer exhibited a significantly and beneficially reduced storage modulus (G'), and therefore an improved predictive cold weather performance compared to Experimental rubber Sample C and also compared to Comparative rubber Samples A and B.

Therefore, it is concluded that it was discovered that the inclusion of the freely added soybean oil for rubber Sample D enabled the rubber composition C containing the specialized styrene/butadiene rubber with its specialized molecular weight profile to achieve a beneficially improved predictive cold weather performance property.

(2) The tangent delta (tan delta) value at 0° C. is used as an indicator of wet traction performance. Higher values are considered better for predictive wet traction performance for a tire tread of such rubber composition.

From Table 2 is it seen that for cured Experimental rubber Samples C and D containing the specialized styrene/butadiene rubber with its molecular weight profile, where rubber Sample D also contained the freely added soybean oil, their tan delta values at −0° C. of 0.44 and 0.42, respectively, were substantially the same as the tan delta values of 0.42 and 0.40, respectively, for Comparative rubber Samples A and B.

Therefore, it is concluded that it has been discovered that the inclusion of the freely added soybean oil of Experimental rubber Sample D enabled the specialized styrene/butadiene elastomer containing rubber Sample C to achieve a beneficially improved predictive cold weather performance without significantly affecting its predictive wet traction performance for a tire read of such rubber composition.

(3) The din abrasion relative volume loss is used as an indicator of treadwear performance. Lower values are considered better for predictive beneficial treadwear resistance and therefore extended tread life (sometimes referred to as treadwear performance) for a tire tread of such rubber composition.

It is concluded that, with lower values of the relative volume loss considered as being better for predictive treadwear performance for a tire having a tread of such rubber composition that:
(a) Experimental rubber Sample C exhibited a reduced predictive treadwear performance compared to Comparative rubber Samples A and B, and
(b) Experimental rubber Sample D containing the freely added soybean oil in addition to the specialized styrene/butadiene elastomer exhibited a significantly and beneficially reduced relative volume loss, and therefore an improved predictive treadwear performance compared to Experimental rubber Sample C and also compared to Comparative rubber Samples A and B.

Therefore, it is concluded that it has been discovered that the inclusion of the freely added soybean oil of Experimental rubber Sample D enabled the specialized styrene/butadiene elastomer containing rubber Sample C to achieve a beneficially improved predictive treadwear performance without significantly affecting its predictive wet traction performance for a tire tread of such rubber composition.

(C) Tensile Properties

Rubber composition toughness is used as an indicator of chip/chunk performance with higher values being predictive of better chip/chunk performance in a sense of being more resistive to chipping and chunking of the tire tread of such rubber composition during tire service. It was therefore discovered that the inclusion of the freely added soybean oil in the specialized styrene/butadiene elastomer-containing rubber composition of Experimental rubber Sample D resulted in a rubber composition toughness of 1640 which is a significant improvement over the toughness values of Control rubber Samples A and B as well as Experimental rubber Sample C which have toughness of 1369, 1088 and 1144, respectively. While the discovered results are not entirely understood, it is envisioned that unsaturation in the soybean oil interacts with the cure of the rubber composition to result in more robust tensile properties.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a tread of a rubber composition containing, based on parts by weight per 100 parts by weight of the rubber (phr),
    (A) conjugated diene-based elastomers comprised of:
        (1) about 30 to about 60 phr of a specialized styrene/butadiene elastomer having a molecular weight profile comprised of a weight average molecular weight (Mw) in a range of from about 500,000 to about 800,000 with a low molecular weight content limited to a maximum of six percent of said styrene/butadiene elastomer having a weight average molecular weight (Mw) of up to 150,000, and correspondingly,
        (2) about 40 to about 70 phr of at least one additional conjugated diene-based elastomer,
    (B) about 40 to about 150 phr of reinforcing filler composed of rubber reinforcing carbon black and without precipitated silica, and
    (C) about 10 to about 50 phr of rubber processing oil comprised of triglyceride vegetable oil.

2. The tire of claim 1 wherein the rubber composition contains a combination of rubber processing oils comprised of petroleum based oil and triglyceride vegetable oil where greater than 50 weight percent of said rubber processing oil is said triglyceride vegetable oil.

3. The tire of claim 1 wherein said triglyceride vegetable oil is a freely added vegetable oil.

4. The tire of claim 1 wherein said triglyceride vegetable oil is comprised of at least one of soybean, sunflower, rapeseed, and canola oil.

5. The tire of claim 1 wherein said specialized styrene/butadiene elastomer has a heterogeneity index (Mw/Mn) in a range of from about 1.5/1 to about 1.8/1.

6. The tire of claim 1 wherein said rubber composition of said tire tread is sulfur cured.

7. The tire of claim 1 wherein said additional conjugated diene-based elastomer is comprised of a polymer of at least one of isoprene and 1,3-butadiene and of styrene and at least one of isoprene and 1,3-butadiene.

8. The tire of claim 7 wherein said additional styrene/butadiene elastomer is tin or silicon coupled.

9. The tire of claim 1 wherein said additional conjugated diene-based elastomer is at least one of cis 1,4-polybutadiene, cis 1,4-polyisoprene and styrene/butadiene elastomers other than said specialized styrene/butadiene elastomer having said molecular weight profile.

10. The tire of claim 1 wherein said specialized styrene/butadiene elastomer is tin or silicon coupled.

11. The tire of claim 1 wherein said specialized styrene/butadiene elastomer has a bound styrene content in a range of from about 10 to about 40 percent and a vinyl 1,2-content in a range of from about 10 to about 60 percent.

12. The tire of claim 1 wherein said specialized styrene/butadiene elastomer has a molecular weight profile comprised of a weight average molecular weight (Mw) in a range of from about 500,000 to about 800,000 with a low molecular weight content limited to a maximum of 5.5 percent of said styrene/butadiene elastomer having a weight average molecular weight (Mw) of up to 150,000.

13. The tire of claim 1 wherein said tread is provided as a sulfur cured rubber composition.

14. The tire of claim 1 wherein said low molecular weight content of said specialized styrene/butadiene elastomer is in a range of from about 1 to about 5.5 percent thereof of a weight average molecular weight in a range of from about 1,000 up to 150,000.

* * * * *